United States Patent
Cao et al.

(10) Patent No.: US 11,059,218 B1
(45) Date of Patent: Jul. 13, 2021

(54) METHODS FOR ADJUSTING HEIGHT OF A 3D PRINTER NOZZLE

(71) Applicant: SHANGHAI FUSION TECH CO., LTD., Shanghai (CN)

(72) Inventors: Xi Cao, Shanghai (CN); Hua Feng, Shanghai (CN); Jianzhe Li, Shanghai (CN); Jinjing Zhang, Shanghai (CN); Wangping Long, Shanghai (CN); Xiaoyu Wu, Shanghai (CN); Zhongwei Yu, Shanghai (CN); Xinpeng Fan, Shanghai (CN); Rui Yuan, Shanghai (CN); Huan Liu, Shanghai (CN)

(73) Assignee: Shanghai Fusion Tech Co., Ltd., Shanghai (CN)

( * ) Notice: Subject to any disclaimer, the term of this patent is extended or adjusted under 35 U.S.C. 154(b) by 0 days.

(21) Appl. No.: 16/822,879

(22) Filed: Mar. 18, 2020

(30) Foreign Application Priority Data

Feb. 28, 2020 (CN) .......................... 202010127243.7

(51) Int. Cl.
*B29C 64/118* (2017.01)
*B33Y 10/00* (2015.01)
*B29K 101/12* (2006.01)

(52) U.S. Cl.
CPC ............ *B29C 64/118* (2017.08); *B33Y 10/00* (2014.12); *B29K 2101/12* (2013.01)

(58) Field of Classification Search
None
See application file for complete search history.

(56) References Cited

U.S. PATENT DOCUMENTS

| 10,155,346 | B1 | 12/2018 | Gorgi et al. | |
|---|---|---|---|---|
| 2015/0352790 | A1* | 12/2015 | Hadas | B29C 64/118 |
| | | | | 700/119 |
| 2016/0144564 | A1* | 5/2016 | Padgett | B29C 64/232 |
| | | | | 425/113 |
| 2016/0243805 | A1 | 8/2016 | Satoh | |
| 2017/0050374 | A1* | 2/2017 | Minardi | B29C 64/124 |
| 2018/0186094 | A1 | 7/2018 | Yang | |

FOREIGN PATENT DOCUMENTS

| CN | 103552243 A | 2/2014 |
|---|---|---|
| CN | 105689864 A | 6/2016 |
| CN | 105922354 A | 9/2016 |

(Continued)

*Primary Examiner* — Monica A Huson
*Assistant Examiner* — Kelsey C Grace
(74) *Attorney, Agent, or Firm* — Avant Law Group, LLC

(57) ABSTRACT

A method for adjusting height of a 3d printer nozzle. In an embodiment, the method uses a fully wavy line as a reference line. The method includes the following steps. Determining an initial value of a height difference between the nozzle and a bottom of a probe by using a feeler gauge. Moving the nozzle vertically to adjust the height based on the initial value, obtaining a printing height of a first line, and printing the first line. Determining whether the first line is a fully wavy line. Adjusting the height of the nozzle for N times according to a preset step value, and printing N lines with corresponding heights. Determining whether the N lines have a fully wavy line. Calculating the height difference between the nozzle and the bottom of the probe by an equation. Adjusting the height of the nozzle.

8 Claims, 1 Drawing Sheet

(56) References Cited

FOREIGN PATENT DOCUMENTS

| CN | 107745520 A | 3/2018 |
| CN | 109334006 A | 2/2019 |
| CN | 208991925 U | 6/2019 |
| CN | 110382236 A | 10/2019 |
| CN | 210255403 U | 4/2020 |
| CN | 1099129 A | 7/2020 |

* cited by examiner

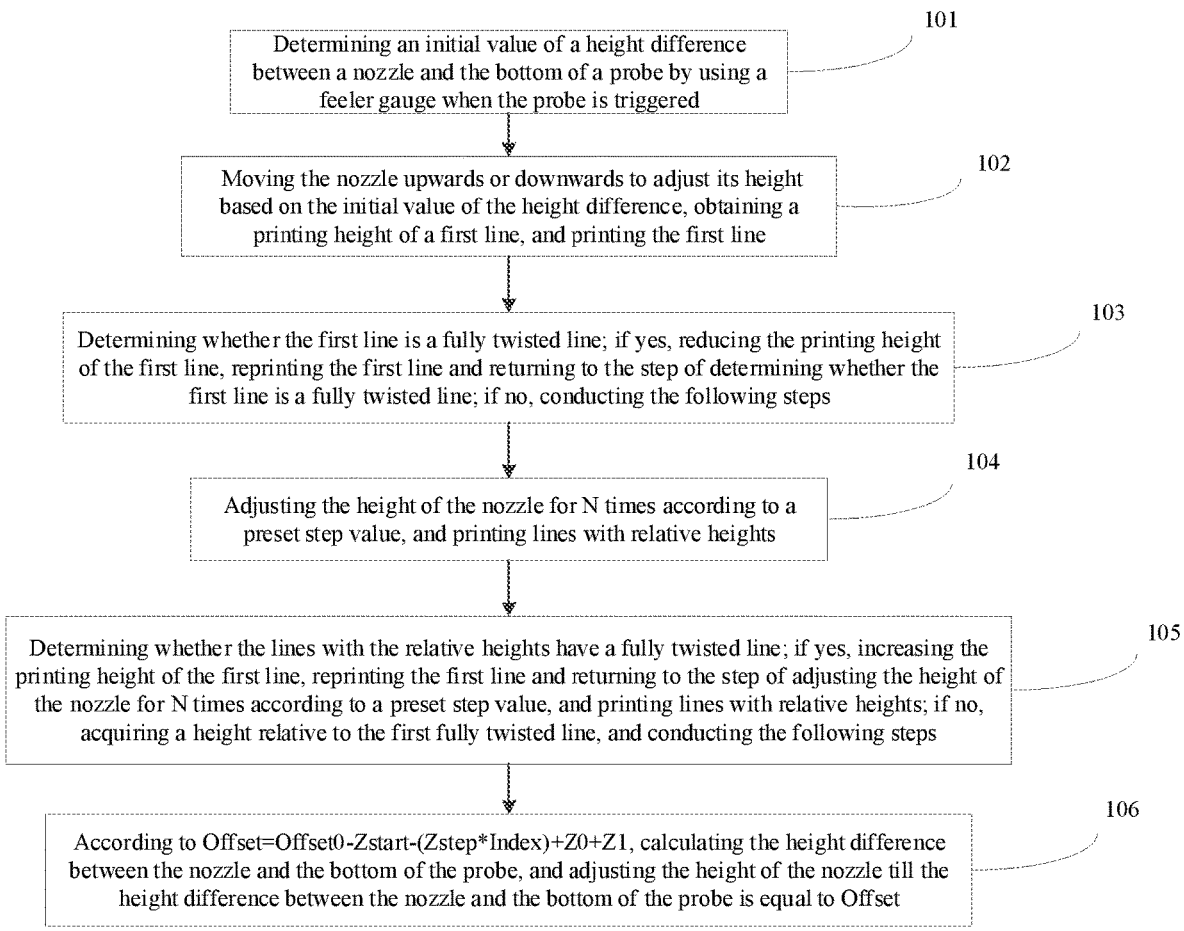

METHODS FOR ADJUSTING HEIGHT OF A 3D PRINTER NOZZLE

CROSS REFERENCE TO RELATED APPLICATIONS

This application claims priority to Chinese Application Number 20201012724-3.7, filed on Feb. 28, 2020, the disclosure of which is incorporated by reference herein in its entirety.

FIELD OF THE DISCLOSURE

The disclosure relates generally to the field of 3D printing technologies. More specifically, the disclosure relates to methods for adjusting height of a 3D printer nozzle.

BACKGROUND 3D printing, also known as additive manufacturing, is a rapid prototyping technique. A typical 3D printing method includes the following steps: heating a thermoplastic filament to be melted, extruding the melted filament through a nozzle, depositing the extruded filament on a printing platform or a former layer of a solidified material, solidifying and modeling when the temperature of the deposited filament is lower than the solidification temperature of the filament, and finally obtaining a printed object. 3D printing technology is widely used in various fields such as art, creative industries, education, jewelry, medical sectors, et cetera.

In a 3D printing process, a user needs to adjust a printer nozzle to be at a proper height according to a best printed line. However, subjective factors may affect the determination of the best printed line. For example, height adjustment of a printer nozzle may be inaccurate. And operations of adjusting height of a printer nozzle usually need to be repeatedly conducted until a proper height of the printer nozzle is obtained, which is usually a tedious and time-consuming process.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, a method for adjusting height of a 3D printer nozzle includes the following steps. (a) Determining an initial value of a height difference between the nozzle and a bottom of a probe by using a feeler gauge when the probe is triggered. (b) Moving the nozzle vertically to adjust the height based on the initial value of the height difference, obtaining a printing height of a first line, and printing the first line. (c) Determining whether the first line is a fully wavy line. (c1) If so, reducing the printing height of the first line, reprinting the first line, and returning to step (c); (c2) if not, proceeding to the next step (d). (d) Adjusting the height of the nozzle for N times according to a preset step value, and printing N lines with corresponding heights. (e) Determining whether the N lines have a fully wavy line. (e1) If so, increasing the printing height of the first line, reprinting the first line, and returning to step (d); (e2) if not, acquiring a height corresponding to the first fully wavy line, and proceeding to next step (f). (f) Calculating the height difference between the nozzle and the bottom of the probe according to the equation as follows. (g) Adjusting the height of the nozzle until the height difference between the nozzle and the bottom of the probe is equal to Offset.

$$\text{Offset} = \text{Offset}_0 - Z_{start} - (Z_{step} \times \text{Index}) + Z_0 + Z_1$$

In the above equation, Offset is a height difference between the nozzle and the bottom of the probe when the probe is triggered, $\text{Offset}_0$ is the initial value of the height difference between the nozzle and the bottom of the probe when the probe is triggered, $Z_{start}$ is the printing height of the first line, $Z_{step}$ is the preset step value, Index is obtained by subtracting 1 from a serial number of the first fully wavy line, $Z_0$ is a height difference between a printed best line and a printing platform, and $Z_1$ is a height difference between the first fully wavy line and the printed best line.

Optionally, the method further includes a step of moving the nozzle over a hotbed before step (a).

Optionally, a 0.3 mm feeler gauge is used to determine the initial value of the height difference between the nozzle and the bottom of the probe.

Optionally, the printed N lines with corresponding heights and the first line have the same width.

Optionally, the width of the first line is 0.8 mm.

Optionally, the aperture of the nozzle is 0.4 mm.

Optionally, the printing height of the first line is reduced by 0.5 mm.

Optionally, the printing height of the first line is increased by 0.5 mm.

BRIEF DESCRIPTION OF THE DRAWINGS

The FIGURE is a flow chart illustrating a method for adjusting height of a 3D printer nozzle according to an embodiment of the disclosure.

DETAILED DESCRIPTION

The following describes some non-limiting exemplary embodiments of the invention with reference to the accompanying drawing. The described embodiments are merely a part rather than all of the embodiments of the invention. All other embodiments obtained by a person of ordinary skill in the art based on the embodiments of the disclosure shall fall within the scope of the disclosure.

As shown in the FIGURE, a method for adjusting height of a 3D printer nozzle may include one or more of the steps 101-105.

Step 101 of the method may include determining an initial value of a height difference between a nozzle and the bottom of a probe by using a feeler gauge when the probe is triggered.

Step 102 of the method may include moving the nozzle vertically to adjust the height based on the initial value of the height difference, obtaining a printing height of a first line, and printing the first line.

Step 103 of the method may include determining whether the first line is a fully wavy line. If yes, the method proceeds to one or more of reducing the printing height of the first line, reprinting the first line, and returning to the step of determining whether the first line is a fully wavy line; If no, the method proceeds to the subsequent step 104.

Step 104 of the method may include adjusting the height of the nozzle for N times according to a preset step value, and printing lines with corresponding heights.

Step 105 of the method may include determining whether the lines with the corresponding heights have a fully wavy line. If yes, the method proceeds to increasing the printing height of the first line, reprinting the first line, and returning to step 104; If no, the method proceeds to acquiring a height corresponding to the first fully wavy line and to the subsequent step 106.

Step 106 of the method may include calculating a current height difference between the nozzle and the bottom of the probe and adjusting the height of the nozzle until the height difference between the nozzle and the bottom of the probe is equal to Offset. The calculation may be based on the following equation.

$$\text{Offset} = \text{Offset}_0 - Z_{start} - (Z_{step} \times \text{Index}) + Z_0 + Z_1$$

In the above equation: Offset is a height difference between the nozzle and the bottom of the probe when the probe is triggered, $\text{Offset}_0$ is the initial value of the height difference between the nozzle and the bottom of the probe when the probe is triggered, $Z_{start}$ is the printing height of the first line, $Z_{step}$ is the preset step value, Index is obtained by subtracting 1 from a serial number of the first fully wavy line, $Z_0$ is a height difference between a printed best line and a printing platform, and $Z_1$ is a height difference between the first fully wavy line and the printed best line.

The method may include a step of using a 0.3 mm feeler gauge to determine the initial value of the height difference between the nozzle and the bottom of the probe when the probe is triggered, which may help to quickly measure the height difference between the nozzle and the bottom of the probe.

The method may include a step of adjusting the height of the nozzle for N times according to a preset step value, and printing N lines with corresponding heights. In some examples, the N number may be fifteen. In other words, sixteen lines (fifteen lines and the first line) may be printed in an ascending sequence. A preset step value in a z-axis direction may be $Z_{step}$; that is, the printing height of each line may be $Z_{step}$ mm greater than that of a former line. Further, in some examples, in order to ensure that the width of the first line is equal to the widths of the lines with the corresponding heights, the aperture of the nozzle may be 0.4 mm, and the width of the printed line may be 0.8 mm. In other examples, the printing height of the first line may be reduced by 0.5 mm or may be increased by 0.5 mm.

Various embodiments of the disclosure may have one or more of the following effects. Methods may include adjusting height of a 3D printer nozzle, which does not require manual position adjustment of one or more printer nozzles, thus simplifying adjustment operations. Methods may include adjusting height of a 3D printer nozzle, which may simply and rapidly adjust the nozzle to a proper height. Methods may include adjusting height of a 3D printer nozzle in which the first line starts printing at a height $Z_{start}$, and the $Z_{start}$ is an empirical value based on multiple tests, which may help to quickly measure an accurate height. Methods may include a step of selecting a fully wavy line as the reference so as to not only exclude a half-wavy line caused by an uneven printing platform, but also exclude subjective factors because the first fully wavy line rather than the printed best line is selected to prevent the difficulty of quantitatively determining the printed best line by a user. The disclosure may include a calibration method which may accurately measure the height difference between the nozzle and the bottom of the probe when the probe is triggered. In some examples, the error range may be +/−0.025 mm. The disclosed method may use a fully wavy line as a reference line and adjust the height of a 3D printer nozzle by a calibration equation, which may help to simply operations, produce accurate height adjustments, and exclude subjective factors. In other words, adjustment results may be objective and calibration results may be consistent. In some embodiments, the disclosure may improve the accuracy of height adjustment results of one or more 3D printer nozzles. In other embodiments of the disclosure, a printer nozzle is firstly moved right above a hot bed, the height of the printer nozzle is then adjusted. In further embodiments of the disclosure, a central point of a hotbed is selected as a reference point of the nozzle measurement such that the accuracy of the adjustment results may be improved because the hotbed may have a magnet-distributed central area with the strongest magnetic force and/or most flat surface.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various FIGURES need be carried out in the specific order described.

The disclosure claimed is:

1. A method for adjusting height of a 3D printer nozzle, comprising:
   (a) determining an initial value of a height difference between the nozzle and a bottom of a probe by using a feeler gauge when the probe is triggered;
   (b) moving the nozzle vertically to adjust the height based on the initial value of the height difference, obtaining a printing height of a first line, and printing the first line;
   (c) determining whether the first line is a fully wavy line,
      (c1) if so, reducing the printing height of the first line, reprinting the first line, and returning to step (c), and
      (c2) if not, proceeding to step (d);
   (d) adjusting the height of the nozzle for N times according to a preset step value, and printing N lines with corresponding heights;
   (e) determining whether the N lines have a fully wavy line,
      (e1) if so, increasing the printing height of the first line, reprinting the first line, and returning to step (d), and
      (e2) if not, acquiring a height corresponding to the first fully wavy line, and proceeding to step (f):
   (f) calculating a current height difference between the nozzle and the bottom of the probe according to the following equation:

$$\text{Offset} = \text{Offset}_0 - Z_{start} - (Z_{step} \times \text{Index}) + Z_0 + Z_1; \text{ and}$$

(g) adjusting the height of the nozzle until the height difference between the nozzle and the bottom of the probe is equal to Offset;
   wherein:
      Offset is a height difference between the nozzle and the bottom of the probe when the probe is triggered;
      $\text{Offset}_0$ is the initial value of the height difference between the nozzle and the bottom of the probe when the probe is triggered;

$Z_{start}$ is the printing height of the first line;
$Z_{step}$ is the preset step value;
Index is obtained by subtracting 1 from a serial number of the first fully wavy line;
$Z_0$ is a height difference between a printed best line and a printing platform; and
$Z_1$ is a height difference between the first fully wavy line and the printed best line.

2. The method according to claim 1, wherein the method further comprises a step (a0) of moving the nozzle over a hotbed before step (a).

3. The method according to claim 1, wherein the feeler gauge is a 0.3 mm feeler gauge.

4. The method according to claim 3, wherein the printing height of the first line is increased by 0.5 mm.

5. The method according to claim 1, wherein the N lines and the first line have the same width.

6. The method according to claim 5, wherein the width of the first line is 0.8 mm.

7. The method according to claim 1, wherein an aperture of the nozzle is 0.4 mm.

8. The method according to claim 1, wherein the printing height of the first line is reduced by 0.5 mm.

* * * * *